(12) United States Patent
Harrison

(10) Patent No.: US 8,749,998 B2
(45) Date of Patent: Jun. 10, 2014

(54) MOBILE DEVICE ADAPTER AND CHARGER

(75) Inventor: Lee Harrison, Wilstead (GB)

(73) Assignee: ACCO Brands Corporation, Lake Zurich, IL (US)

( * ) Notice: Subject to any disclaimer, the term of this patent is extended or adjusted under 35 U.S.C. 154(b) by 330 days.

(21) Appl. No.: 13/345,085

(22) Filed: Jan. 6, 2012

(65) Prior Publication Data

US 2012/0201058 A1 Aug. 9, 2012

Related U.S. Application Data

(60) Provisional application No. 61/430,507, filed on Jan. 6, 2011.

(51) Int. Cl.
*H02H 7/125* (2006.01)

(52) U.S. Cl.
USPC .............................................. 363/53; 363/127

(58) Field of Classification Search
USPC .............. 363/16, 17, 21.07, 21.16, 21.17, 53, 363/127
See application file for complete search history.

(56) References Cited

U.S. PATENT DOCUMENTS

| 5,055,747 A | 10/1991 | Johns | |
|---|---|---|---|
| 8,027,174 B2 * | 9/2011 | Ryu et al. | 363/16 |
| 2008/0273355 A1 * | 11/2008 | Yos et al. | 363/24 |
| 2010/0165673 A1 | 7/2010 | Chang et al. | |

FOREIGN PATENT DOCUMENTS

| JP | 2007-336797 A | 12/2007 |
|---|---|---|
| WO | 2005-099280 A2 | 10/2005 |

OTHER PUBLICATIONS

International Application No. PCT/US2012/020360, International Search Report and Written Opinion mailed on Aug. 7, 2012, 9 pages.

\* cited by examiner

*Primary Examiner* — Adolf Berhane
*Assistant Examiner* — Yemane Mehari
(74) *Attorney, Agent, or Firm* — Michael Best & Friedrich LLP

(57) ABSTRACT

Systems and methods are presented for an improved high power density power adapter. On one potential embodiment, an improved power adapter includes an AC input; a rectifier coupled to the AC input; a power factor correction circuit coupled to the rectifier; and a burst switch circuit coupled to the power factor correction circuit. The burst switch circuit provides power to a DC output via a set of FET drivers, a set of FETs, and a transformer and may provides power exclusively in a burst mode using a feedback input from the DC output. The transformer may be composed of windings coupled to the set of FETs, and additional windings embedded in the PCB and coupled to the first winding. Certain windings may comprise a conductive ribbon that loops around a transformer core. Additional embodiments may include monitoring circuits and multiple outputs.

20 Claims, 21 Drawing Sheets

MOBILE DEVICE ADAPTER AND CHARGER

BACKGROUND

The present application related to DC power supplies, and AC to DC power adapters. The present application further refers to multi-function power supplies, USB power supplies, and improved power supply efficiency, power density, and circuit protection.

With a modern proliferation of electronic devices, a wide variety of interconnects and power supplies to communicate with and power those electronic devices has emerged in a broad range of shapes, sizes, and connection formats. For many computing devices, power is provided to the device via a switching power supply that receives an AC input and provides a DC power to the electronic device. One potential interconnect is a simple DC tip input to an electronic device. Additionally, while there are various power supply connection formats from a power supply to an electronic device, a universal serial bus (USB) interface is a commonly used connecting interface.

The USB interface includes the benefit of being able to function both as an information connection and a connection for device charging. A general USB interface has pin definitions comprising a VBUS terminal, a D+ terminal, a D− terminal and a ground terminal. The VBUS terminal and the ground terminal are used to output DC power if the USB interface connects to a DC power source. The D+ and D− terminals are used to transmit data. Compared with conventional computer connecting buses, the USB interface is capable of transmitting data and providing electric power as a power supply connection in a standardized format. Because of the above-mentioned features, some portable electronic devices are designed to have USB interfaces for connecting to computers and charging the portable electronic devices from the computers. While power adapters and power supplies currently exist to support broad range of devices, there is an increasing need due to the numbers of devices in use by individual users or households that require charging. Improved mobile device adapters and chargers that can provide power adapting and charging functions for different types of devices and multiple devices simultaneously may therefore improve on the currently available device adapters and power supplies.

BRIEF SUMMARY

Various embodiments of present innovations describe an improved power adapter. Various alternative embodiments include improved power adapters and supplies with improved to DC power supply modules, improved AC to DC power modules, improved multi-function power modules and outputs, improved USB power supplies, and improved power supply efficiency, power density, and circuit protection. Additional combinations and improvements are also described such that alternate combinations of the provided examples may be apparent to one of ordinary skill in the art from the details of the provided examples.

In one particular embodiment, and improved power adapter is described that is made up of an AC input; a rectifier coupled to the AC input; a power factor correction circuit coupled to the rectifier; and a burst switch circuit coupled to the power factor correction circuit. The burst switch circuit provides power to a DC output via a set of FET drivers, a set of FETs, and a transformer, and wherein the burst switch circuit provides a power exclusively in a burst mode using a feedback input from the DC output. The transformer may be composed of a first winding coupled to the set of FETs, and second, third, fourth, and fifth windings each coupled to the first winding, wherein the second winding and the third winding are embedded in a printed circuit board; and wherein the fourth and fifth winding each comprise a conductive ribbon that loops around a transformer core.

Various embodiments may also include a power adapter housing enclosing the power adapter such that the power density of the power adapter enclosed by the power adapter housing is greater than 12 W/cubic inch, providing improved power density over previously known power supplies with equivalent functionality.

Various embodiments may also include a high voltage line coupled to a bus output of the power factor correction circuit, a comparator, and a diode coupled to a transistor, where the transistor is further coupled to the high voltage line. In certain embodiments, the diode and the transistor operate at a start-up of the power adapter to create a low voltage backup that provides operating power to the set of FET drivers at the start-up of the power adapter, and the second winding may create a FET driver operating voltage that replaces the low voltage backup in providing power to the set of FET drivers when the second winding is driven by the first winding. Additionally, certain embodiments may function such that the comparator compares a first comparison voltage with the FET driver operating voltage and the output of the comparator is coupled to the transistor to maintain the low voltage backup when the FET driver operating voltage drops below a predetermined threshold set by the first comparison voltage.

In further embodiments according to the present innovations, an improved power adapter may have a USB switcher coupled to the DC output that drives a USB voltage and a USB current to a first USB output and a second USB output. Certain embodiments may include improved system monitoring with a first monitoring circuit that monitors the USB current and activates a fault input of the power factor correction circuit when the USB current exceeds a current threshold, a second monitoring circuit that monitors the USB voltage and activates the fault input of the power factor correction circuit when the USB voltage exceeds a voltage threshold; and/or a third monitoring circuit that activates the fault input of the power factor correction circuit when a DC output voltage of the DC output exceeds a DC voltage threshold.

DETAILED DESCRIPTION OF THE INVENTION

Embodiments of the invention are directed to AC to DC adapters and chargers having a high power density. These power supplies may be used to charge portable devices with DC tip input or a universal serial bus (USB) port. The high power density enables the power adapter to be compact, and at the same time to provide charging capacity to multiple devices. Additional embodiments enable device protection measure that avoid damage conditions common in previously known power supplies.

Figure 1:
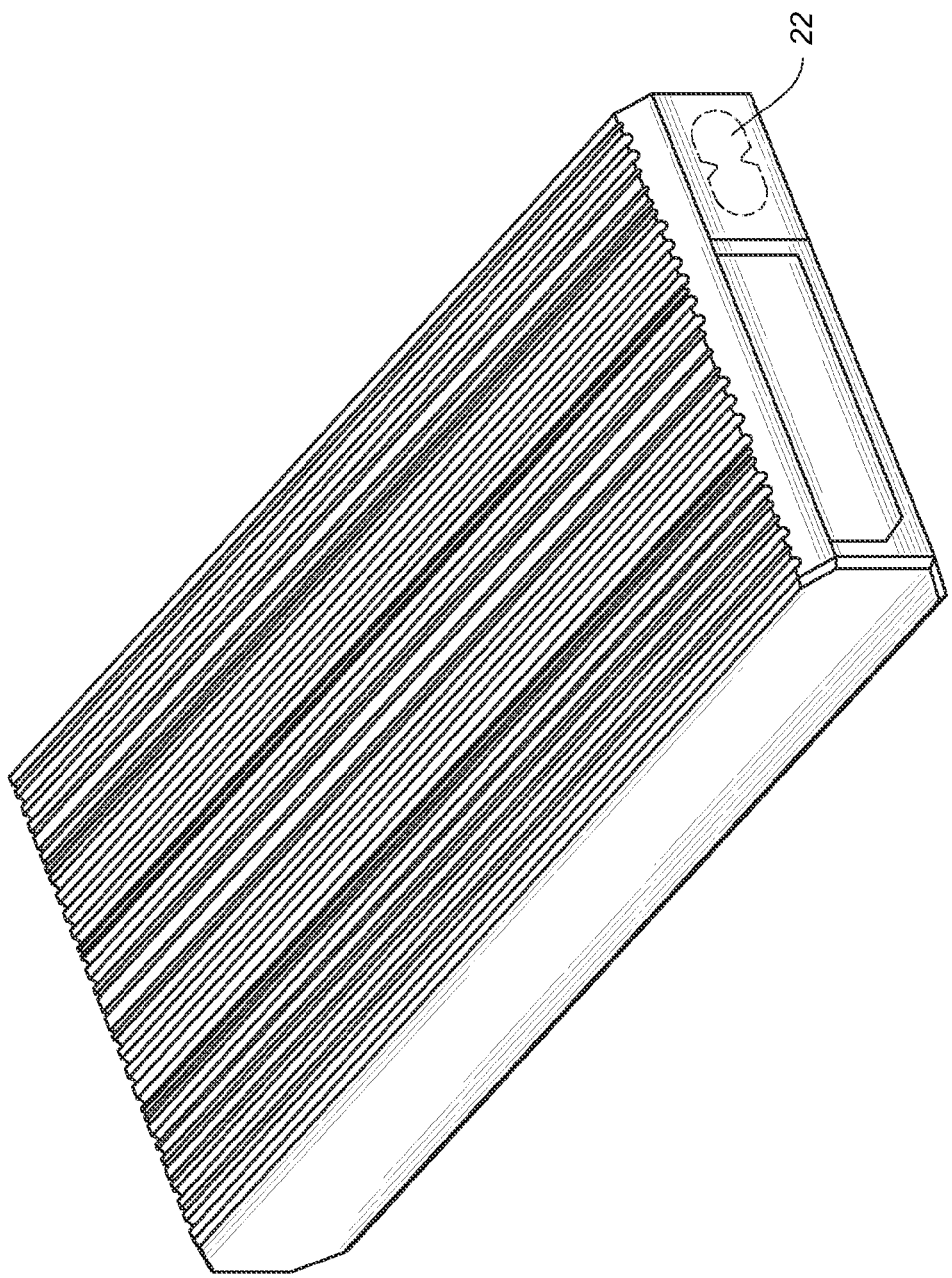
FIG. 1 shows a perspective view of a power adapter according to one embodiment of the innovations herein.
Figure 3:
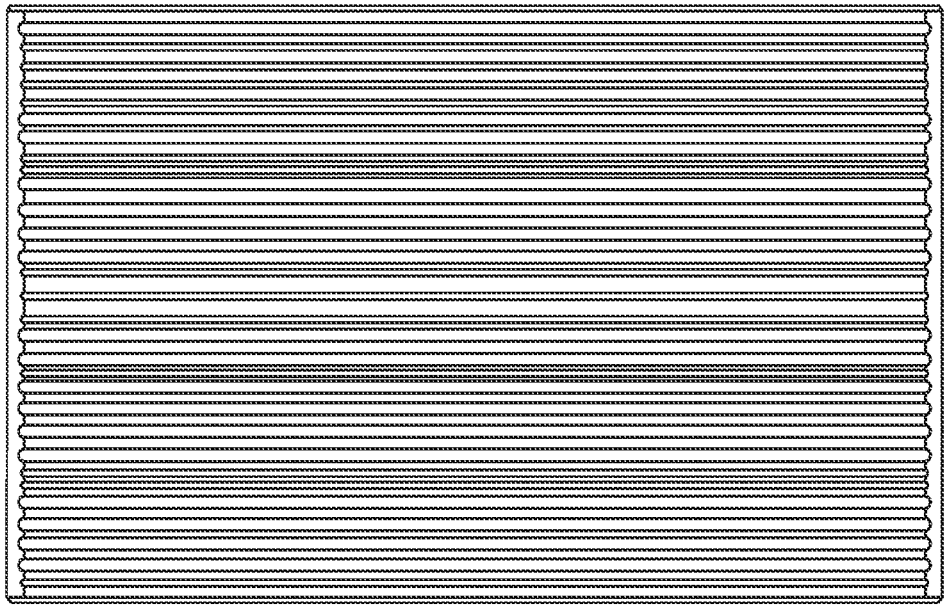
FIG. 3 shows a bottom view of a power adapter according to one embodiment of the innovations herein.
Figure 2:
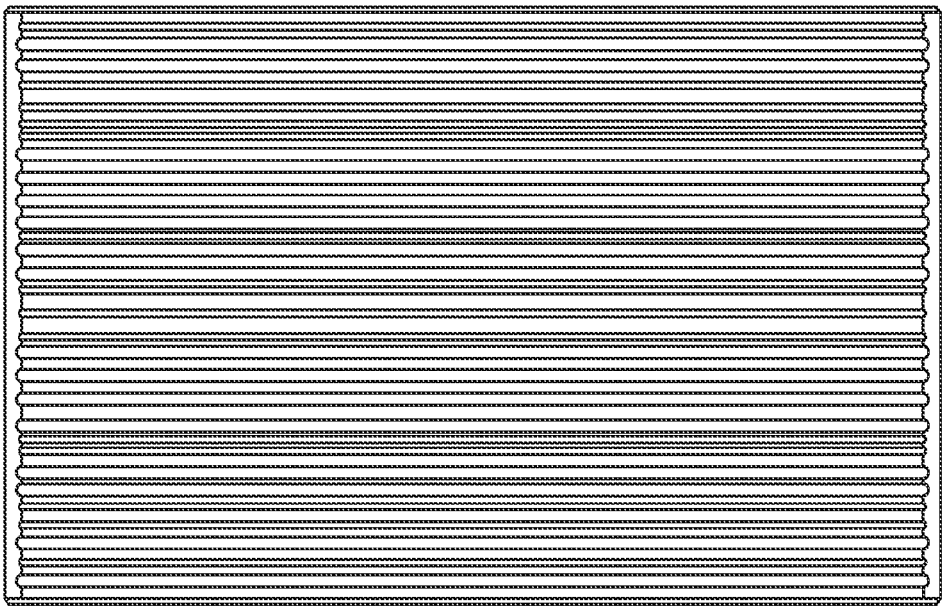
FIG. 2 shows a top view of a power adapter according to one embodiment of the innovations herein.
Figure 4:
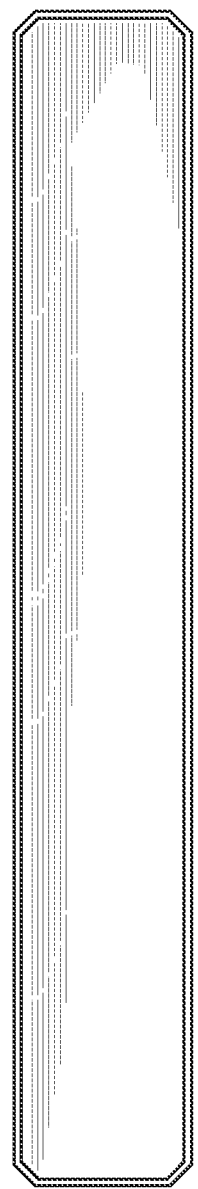
FIG. 4 shows a side view of a power adapter according to one embodiment of the innovations herein.
Figure 5:
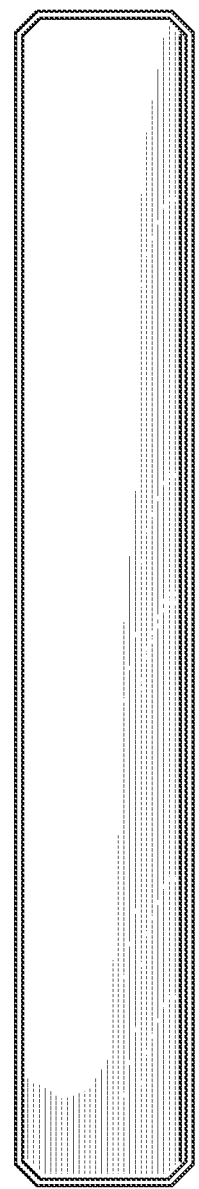
FIG. 5 shows a side view of a power adapter according to one embodiment of the innovations herein.
Figure 6:
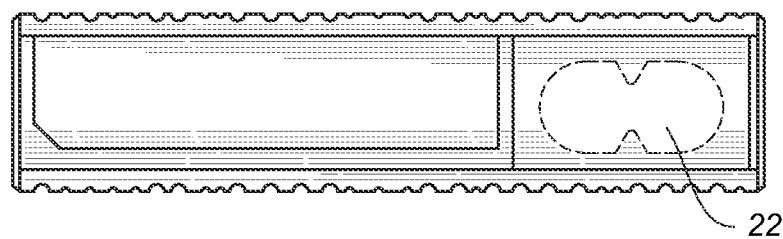
FIG. 6 shows an end view of a power adapter including an AC input according to one embodiment of the innovations herein.
Figure 7:
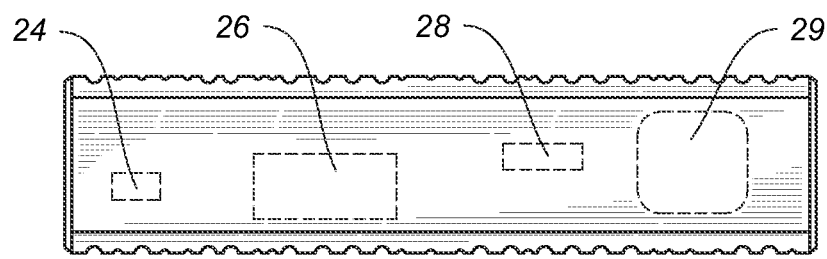
FIG. 7 shows an end view of a power adapter including power output connections according to one embodiment of the innovations herein.

FIGS. 1-7 describe one potential embodiment of a high power density adapter. FIG. 1 details a perspective view, and shows AC input 22. FIGS. 2-3 show side angles and FIGS. 4-5 show top and bottom views. Aspects of the present innovations allow the power adapter to have a power density greater than 12 Watts/cubic inch, and additionally enable a thin profile. FIG. 6 shows an end perspective that includes AC input 22. FIG. 7 shows an opposite end of the power adapter from the end shown in FIG. 6, and includes cover switch 24, DC output 29, USB port 26, and mini-USB port 28. FIGS. 1-7 are provided for illustrative purposes, and do not limit the shape or port configurations possible under different embodiments. Alternative embodiments may include a DC tip output with two USB ports, or any combination of USB, mini-USB, or micro-USB ports. Further alternative embodiments may include three or more USB ports with additional supporting protection circuitry.

Figure 8:
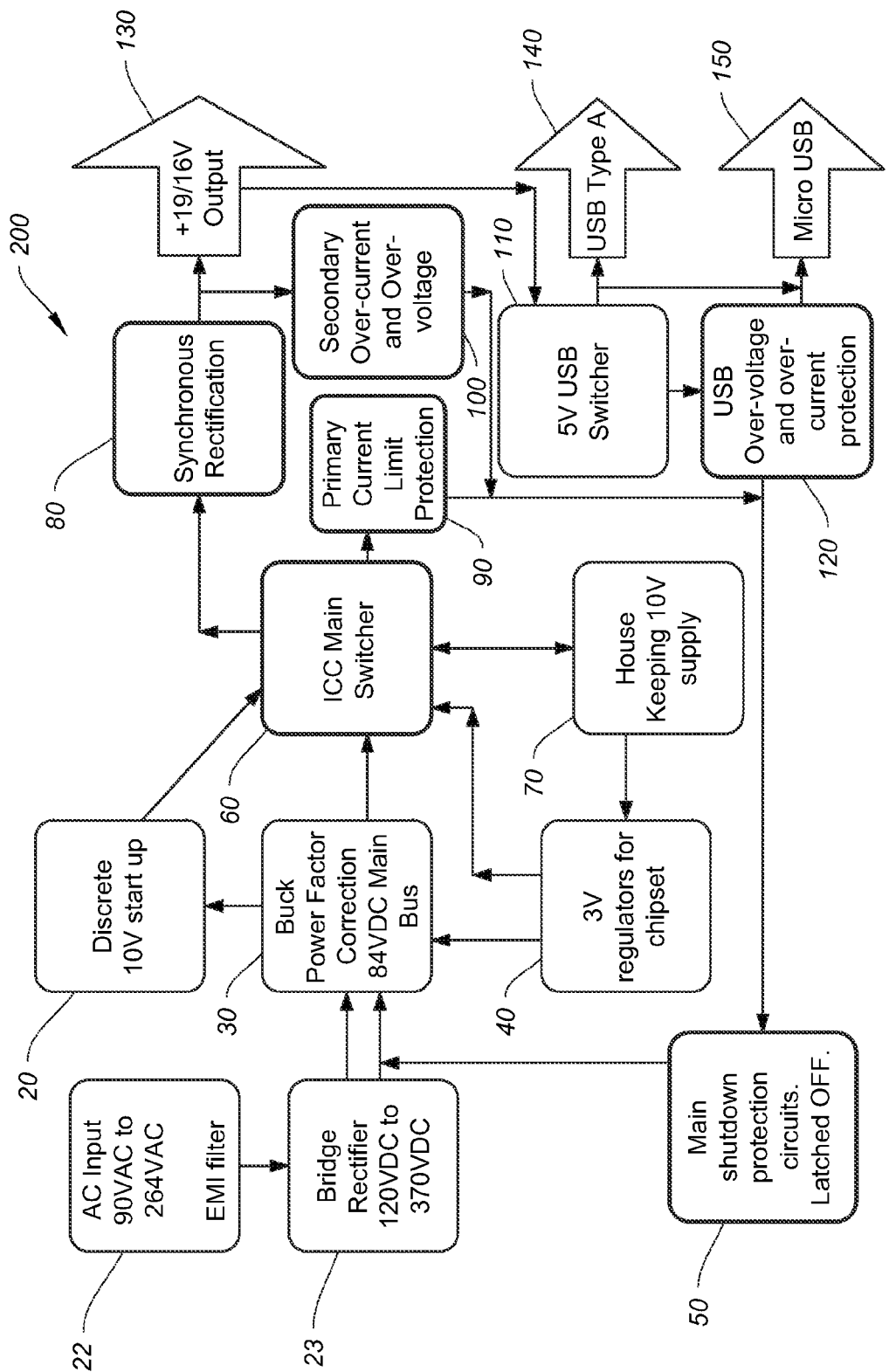
FIG. 8 shows a block diagram of one potential embodiment of a high power density burst power adapter.

FIG. 8 shows one embodiment of a simplified system diagram for a power adapter 200 according to the innovations herein. Power adapter 100 comprises AC input 22, rectifier 23, power factor correction circuit 30, discrete second bus start up circuit 20, chipset regulator 40, shutdown protection circuit 50, burst switcher circuit 60, adapter housekeeping circuit 70, synchronous rectification circuit 80, primary protection circuit 90, secondary protection circuit 100, USB switcher 110, USB protection circuit 120, DC output 130, first USB output 140, and second USB output 150

AC input 22 and bridge rectifier 23 work together to accept an AC input and deliver the AC input to power factor correction circuit 30. In one potential embodiment, AC input 22 accepts an AC input that is between 90 V and 264 VAC. Rectifier 23 may be any rectifier that delivers a single polarity voltage, for example a standard bridge rectifier. The voltage output from the rectifier 23 is then input to power factor correction circuit 30. Output power from rectifier 23 or AC input 22 may additionally be used to provide initial start up power for chipset regulator 40 or other components requiring initial start up power.

Power factor correction circuit 30 receives a rectified AC voltage input, and supplies a DC voltage output for use as a voltage and power input by burst switcher circuit 60. Burst switcher circuit 60 drives DC output 130 using burst signals to FETs, drivers, and a transformer that is part of synchronous rectification circuit 80. Burst switcher circuit 60 further relies on a feedback signal from DC output 130 to control an output of burst signals which initiate the adapter of power to the DC output 130 via the aforementioned drivers, FETs, and transformer. DC output 130 includes connections that further adapter power to USB switcher 110. USB switcher 110 then enables power output at first USB output 140 and second USB output 150.

Power adapter 200 additionally includes protection circuitry operating in conjunction with above described system. Primary protection circuit 90 senses fault signals from burst switcher circuit 60, secondary protection circuit 100 senses current and voltage from DC output 130, and USB protection circuit 120 senses voltage and current from USB switcher 110. All three elements of primary protection circuit 90, secondary protection circuit 100, and USB protection circuit 120 provide signals through shutdown protection circuit 50 to enable power shutdown through power factor correction circuit 30.

Power Factor Correction Circuit

Power factor correction circuit 30 accepts the rectified voltage input from rectifier 23, and creates a DC output voltage. In several embodiments, power factor correction circuit comprises power handling electronic switches that effectively connect and disconnect energy storage inductors and capacitors to and from an input source to an output. By varying duty cycle, frequency, or phase shift, the output of power factor correction circuit may be controlled. An active power factor corrector (PFC) is a power electronic system that controls the amount of power drawn by a load in order to obtain a power factor as close as possible to unity. In most applications, the active PFC controls the input current of the load so that the current waveform is proportional to the mains voltage waveform (a sine wave). The purpose of making the power factor as close to unity (1) as possible is to make the load circuitry that is power factor corrected appear purely resistive (apparent power equal to real power). In this case, the voltage and current are in phase and the reactive power consumption is zero. This enables the most efficient delivery of electrical power. Some types of active PFC are buck, boost, and buck-boost. In the case of a switched-mode power adapter, a boost converter is inserted between the bridge rectifier and the main input capacitors. The boost converter attempts to maintain a constant DC bus voltage on its output while drawing a current that is always in phase with and at the same frequency as the line voltage. Another switchmode converter inside the power adapter produces the desired output voltage from the DC bus. This approach requires additional semiconductor switches and control electronics, but permits cheaper and smaller passive components. Due to their very wide input voltage range, many power supplies with active PFC can automatically adjust to operate on AC power supplied by power utilities in most locations. This includes inputs from about 100 V (Japan) to 230 V (Europe).

Specific detail will now be provided to describe an embodiment of a power adapter 2000, with various components of power adapter 2000 detailed in FIGS. 9-15.

Figure 9A:
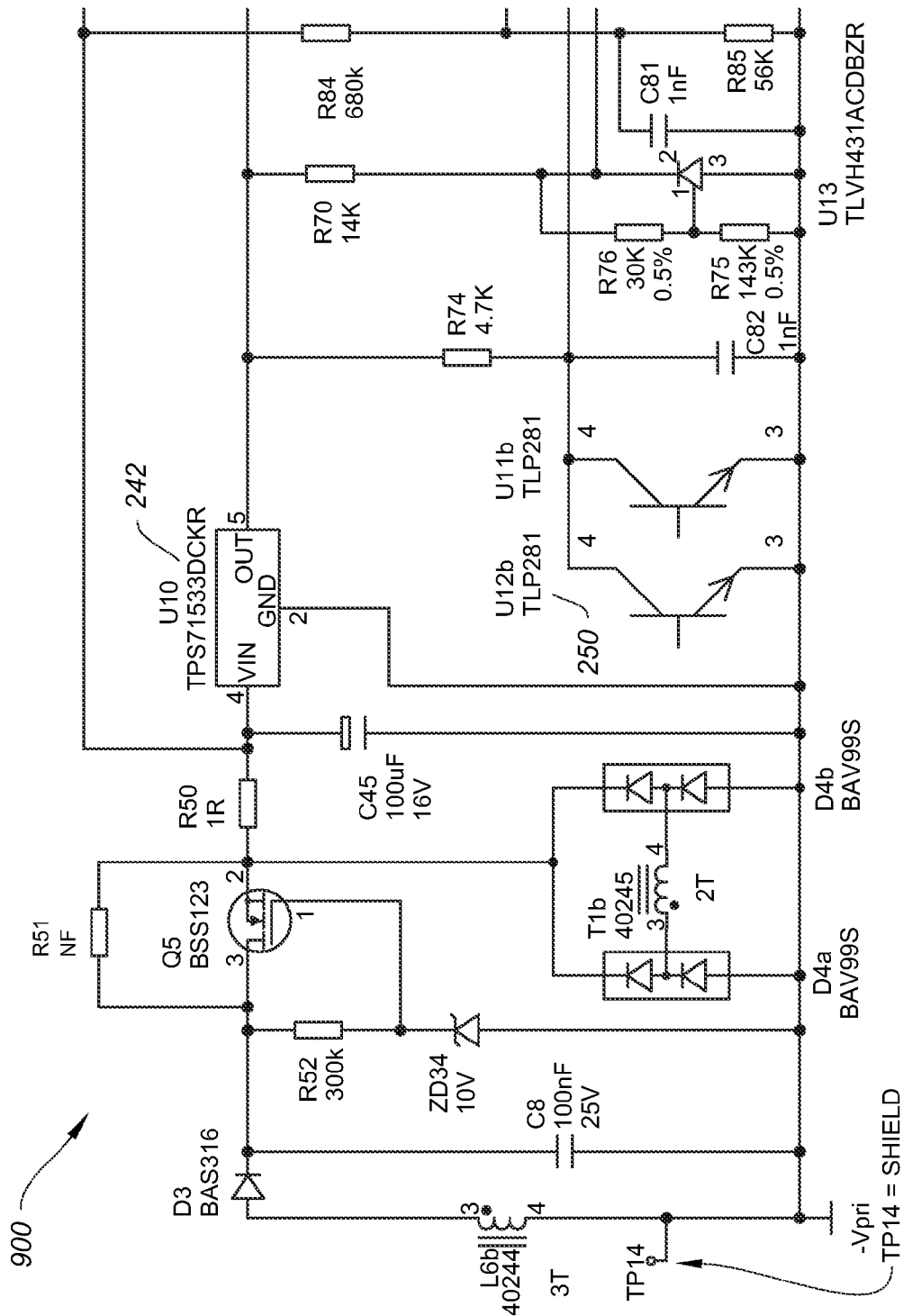
FIG. 9A is a circuit diagram showing one potential implementation of a power factor correction circuit for use in a power adapter.
Figure 9B:
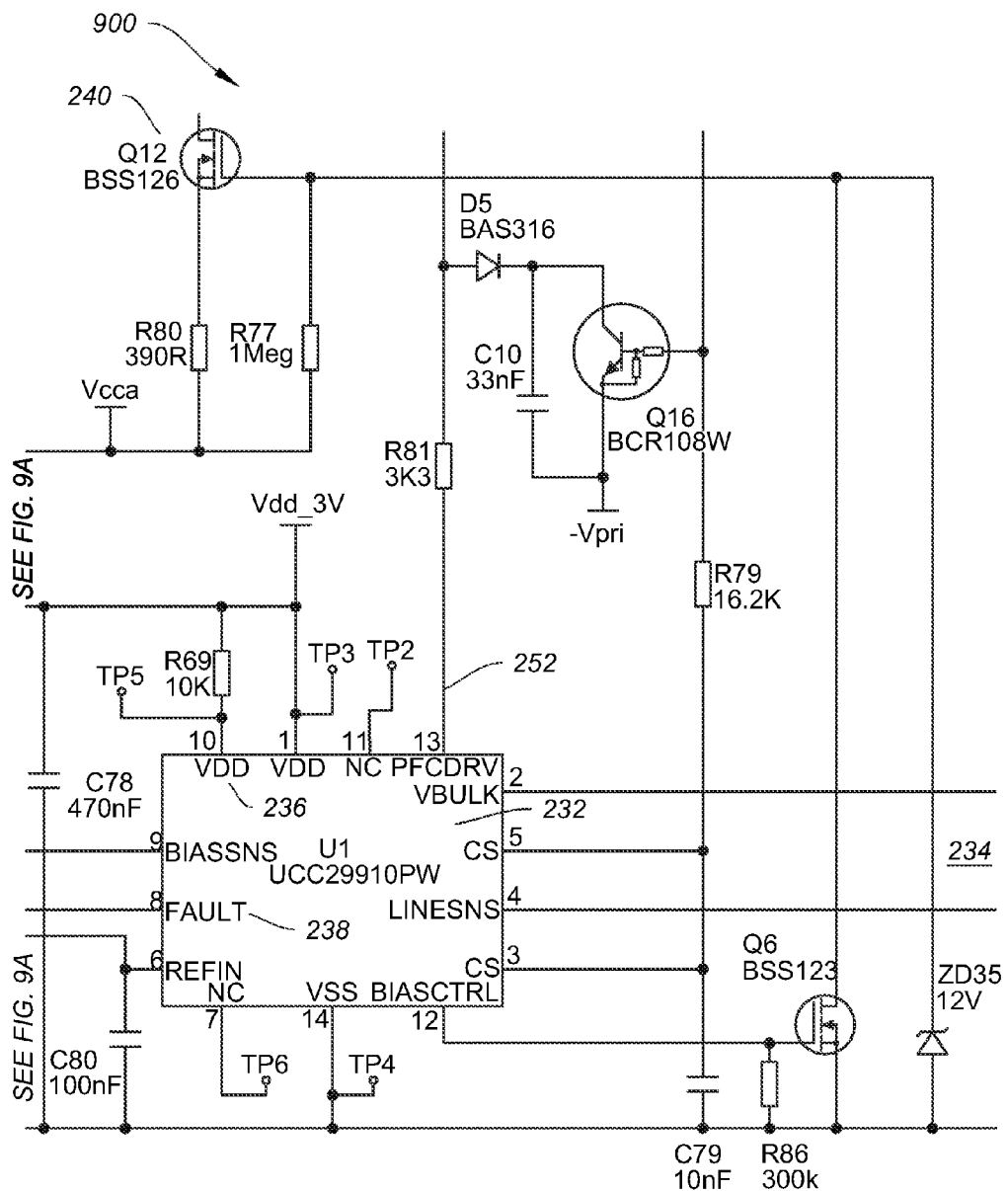
FIG. 9B is a circuit diagram showing one potential implementation of a power factor correction circuit for use in a power adapter.

FIGS. 9A and 9B discloses one potential embodiment of a power factor correction circuit that may be used as in embodiments such as power factor correction circuit that is part of power adapter 2000 in FIG. 8. Power factor correction circuit 900 comprises a buck power factor correction circuit 232. The operation of a basic buck topology uses an inductor and two switches (usually a transistor and a diode) that control the inductor. It alternates between connecting the inductor to source voltage to store energy in the inductor and discharging the inductor into the load. Buck power factor correction circuit 232 may include variations on this bock topology, in addition to additional control circuitry.

Where a traditional adapter would create a DC output voltage for a voltage bus in the range of 360-420V, power factor correction circuit 30 outputs a lower DC voltage. In one potential embodiment, the DC output of power factor correction circuit 30 may be set to any DC voltage between 50V and 150V. In one Embodiment, the DC output of power factor correction circuit is near 84V. A setting in the 80V range allows the use of sub-100V rated capacitors for space savings, while avoiding the losses that occur in a lower voltage. For example, at a setting of 50V, the copper losses in the system become excessive, and traces and currents are required to create a functioning circuit. A setting in the sub 100 VC range also allows for a more dense design as creepage and clearances can be reduced.

Additional functionality of power factor correction circuit will be described below in conjunction with other circuits of FIGS. 9-13.

Burst Switcher Circuit

Figure 10A:
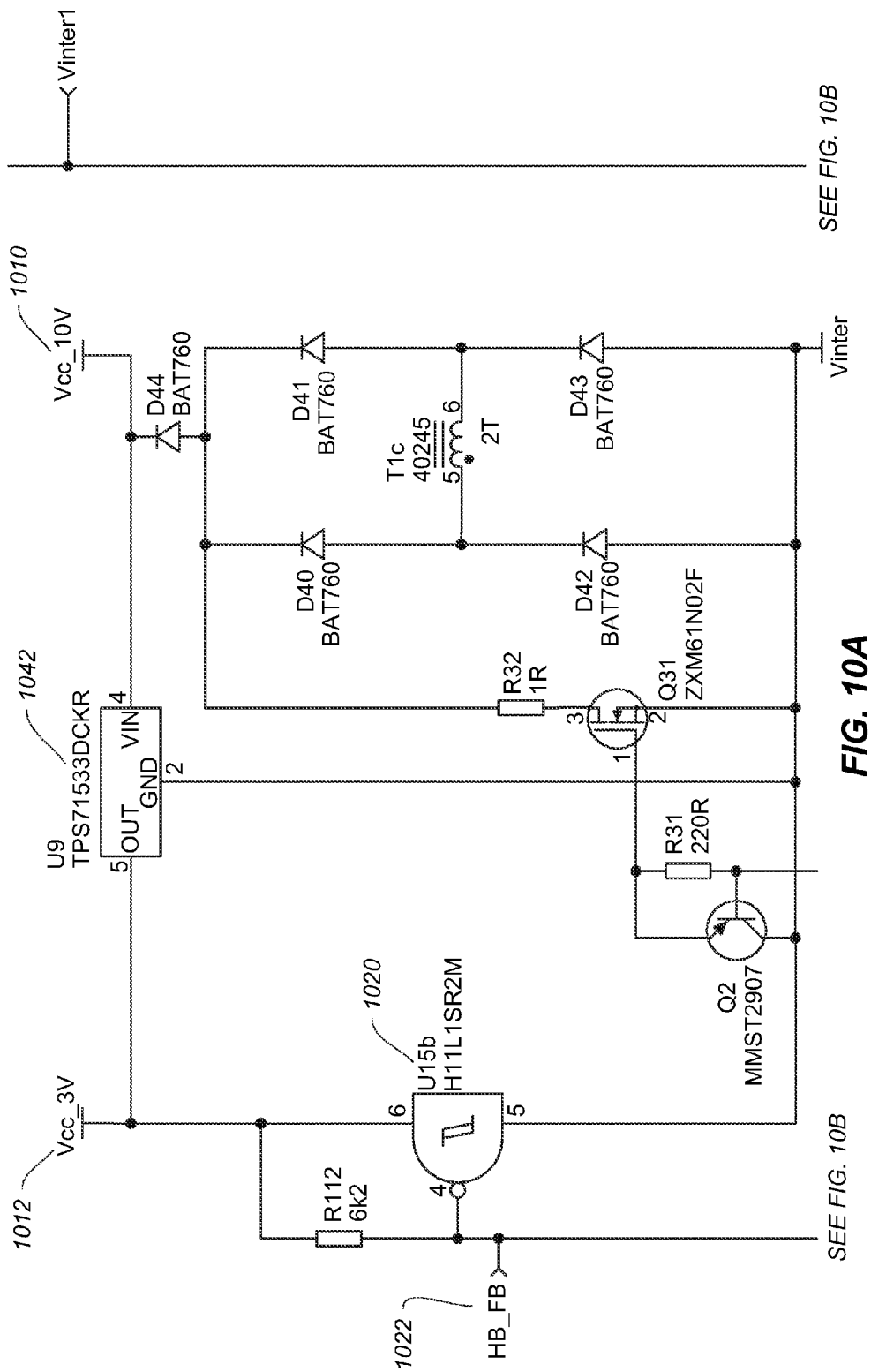
FIG. 10A is a circuit diagram showing one potential implementation of a switcher circuit for use in a power adapter.
Figure 10B:
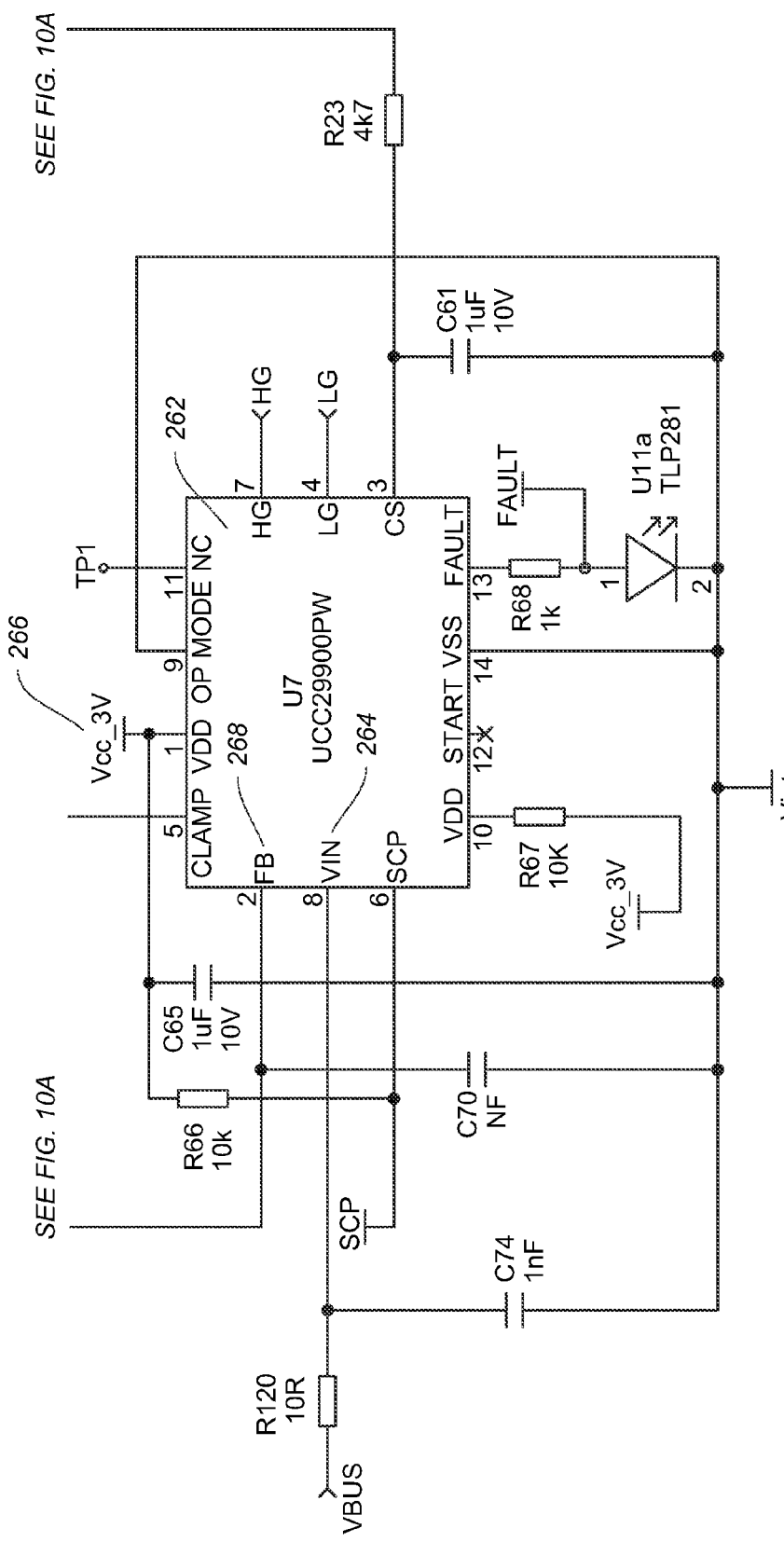
FIG. 10B is a circuit diagram showing one potential implementation of a switcher circuit for use in a power adapter.

FIGS. 10A and 10B describe one potential embodiment of burst switcher circuit 1000, which may be included as part of an embodiment of power adapter 2000 of FIG. 8. Burst switcher circuit 1000 comprises burst switch chip 262. Burst switch chip 262 comprises DC voltage input 264, chipset voltage input 266, high gate output 269a, low gate output 269b, and feedback input 268. During normal operation, burst switcher circuit 1000 provides burst signals to that enable power to a DC output 430 of power adapter 2000. DC output 430 is adapted to match the power demands of a load placed on the DC output through feedback circuitry. Because the burst switcher circuit constantly operates in a feedback mode and adapts to the output load demands, greater efficiency is achieved that in a traditional switched power adapter that does not constantly adapt to the load demands. Additional description of the functionality of burst switcher circuit 1000 will be described below in conjunction with FIGS. 9-13.

Synchronous Rectification and DC Output

Figure 11A:
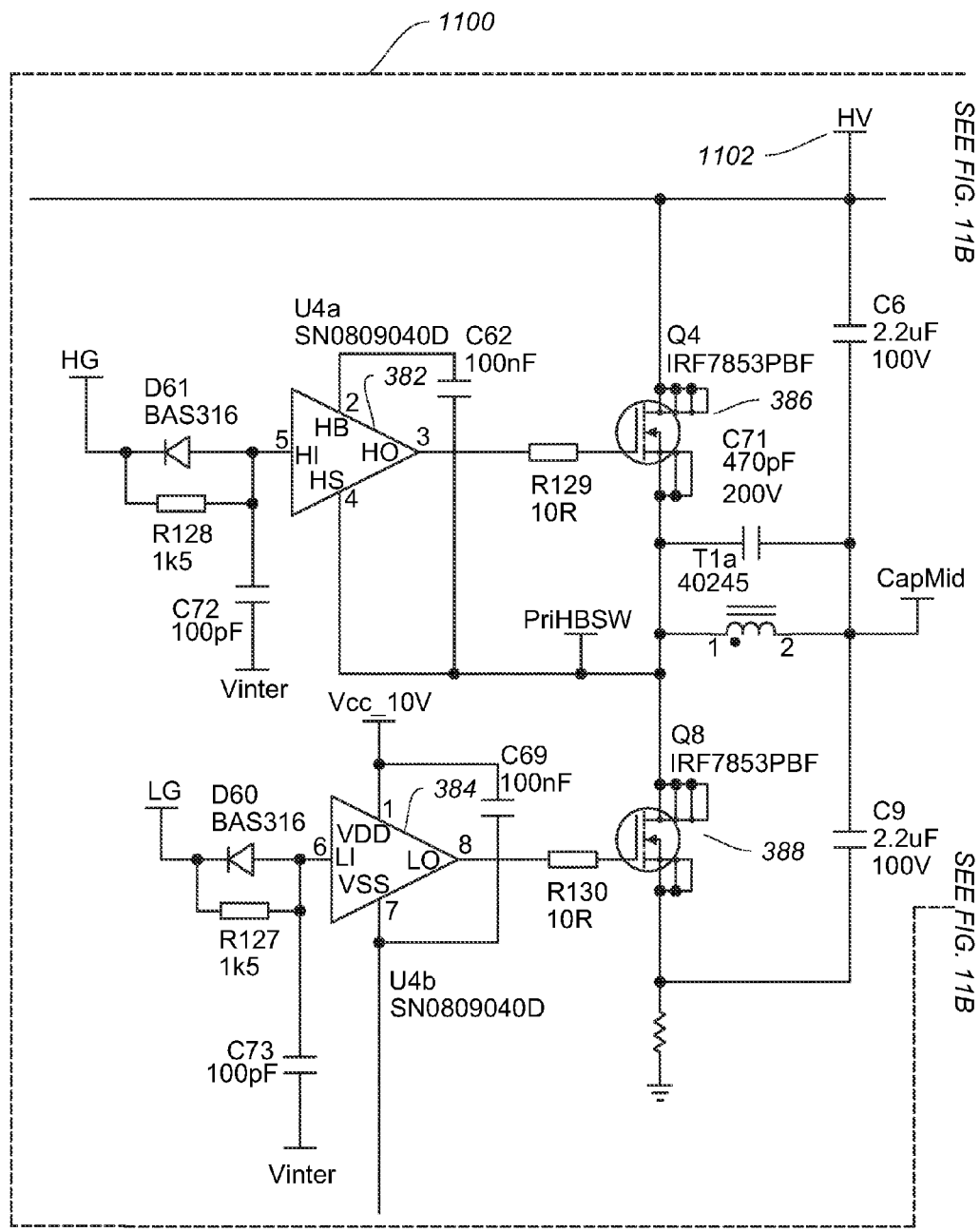
FIG. 11A is a circuit diagram showing one potential implementation of a synchronous rectification circuit and a DC output for use in a power adapter.
Figure 11B:
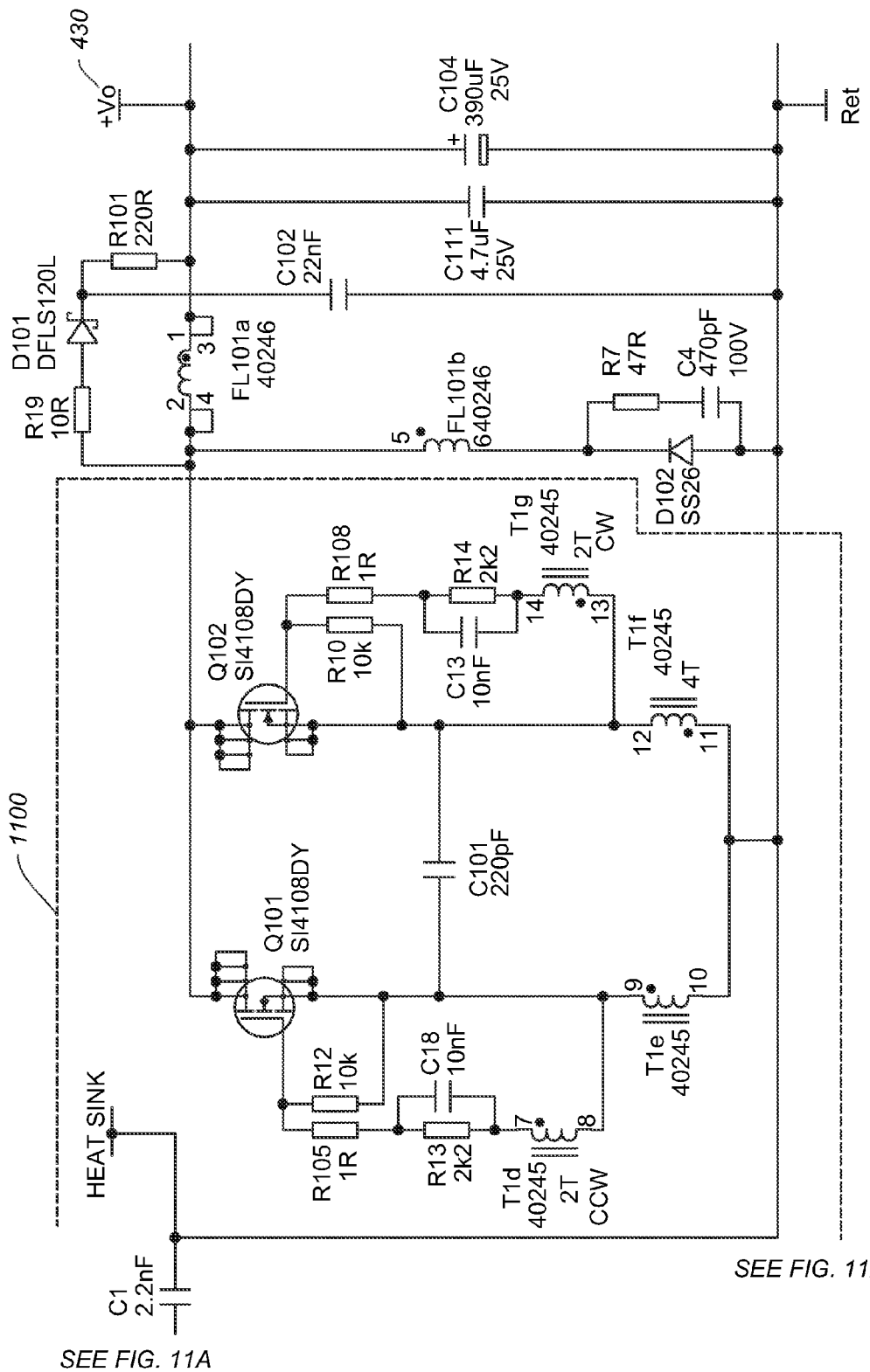
FIG. 11B is a circuit diagram showing one potential implementation of a synchronous rectification circuit and a DC output for use in a power adapter.

FIGS. 11A and 11B describe one potential implementation of synchronous rectification circuit 1100 and DC output 430, both of which may be part of an implementation of power adapter 2000 of FIG. 8. Synchronous rectification circuit 1100 comprises FET drivers 382 and 384, FETs 386 and 388, as well as transformer windings T1a, T1d, T1e, T1g, and T1f. When operating FET driver 382 receives signals from high gate output 269a of FIG. 10 and FET driver 384 receives power from low gate output 269b of FIG. 10. FET drivers 382 and 384 drive FETS 386 AND 388, which in turn drive transformer winding T1a. Transformer winding T1a drives transformer windings T1e and T1f. Transformer winding T1e drives FET Q101 and transformer winding T1f drives FET Q102. FETs Q101 and Q102 drive the current for DC output 430 of T1d and T1g are complementary planar windings. In one potential embodiment, T1d comprises a planar winding in a circuit board consisting of two clockwise windings, and T1g comprises a planar winding in the circuit board consisting of two counter-clockwise windings. T1d and T1g are part of the gate drive circuit used to drive FETs Q101 and Q102. The main windings T1e and T1f are copper foil windings.

In addition to the use of 100V rated capacitors associated with the lower than typical DC output of power factor correction circuit 30, in one potential embodiment, space may be saved and greater power density achieved through the use of surface mount component, and a mixture of planar transformer windings, triple insulated primary winding, and foil transformer windings creating a hybrid design.

For example, in one potential embodiment, transformer windings that are designed to operate below a predetermined current or power threshold may be implemented as embedded planar windings in a circuit board. Transformer windings designed to operate above the predetermined threshold may be implemented using foil windings. Use of planar windings in the circuit board may enable higher power density, and lower product thickness. Similarly, for a high power output transformer, copper foil windings may enable a more compact output transformer, and therefore a circuit board with lower height, a thinner package, and a higher overall power density. In one potential embodiment copper foil is used for all turns and legs attached to the circuit board in a 100 W output transformer.

FIGS. 14-17 describe transformer T1 that includes windings T1a, T1b, T1c, T1d, T1e, T1f, and T1g. Transformer T1 may be used to implement the windings as shown in FIGS. 9, 10, and 11. T1a is a primary winding that drives power to windings T1b-f on both sides of isolation barrier 3.

Figure 15:
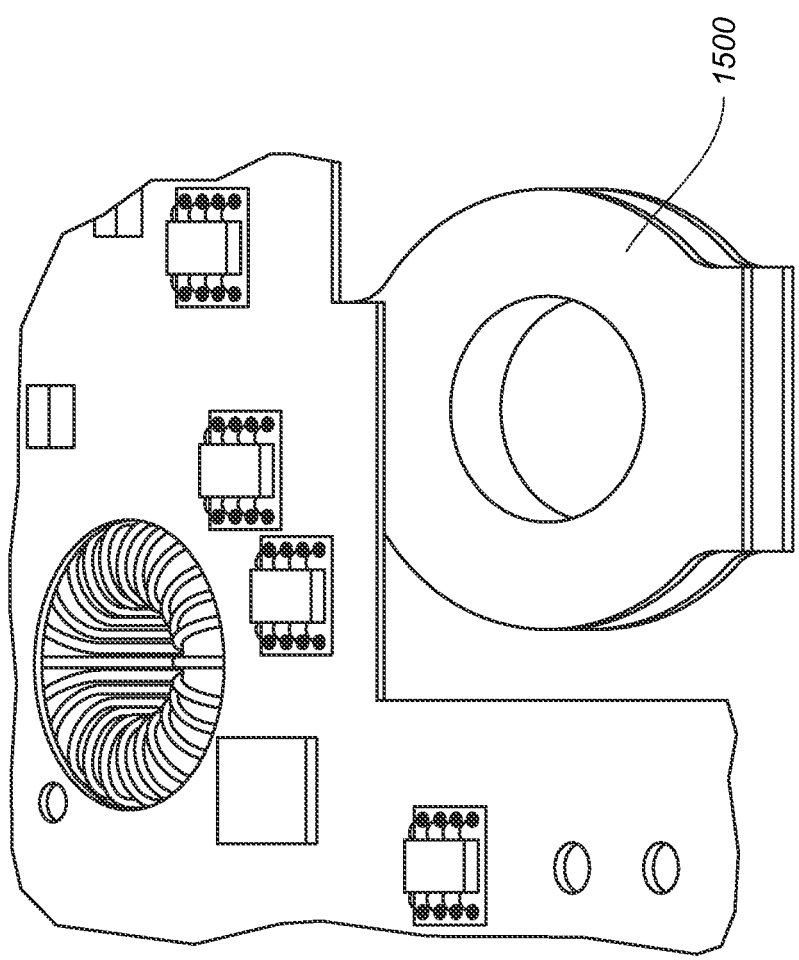
FIG. 15 shows a potential implementation of planar windings in a PCB as part of a transformer for use in a power adapter.
Figure 16:
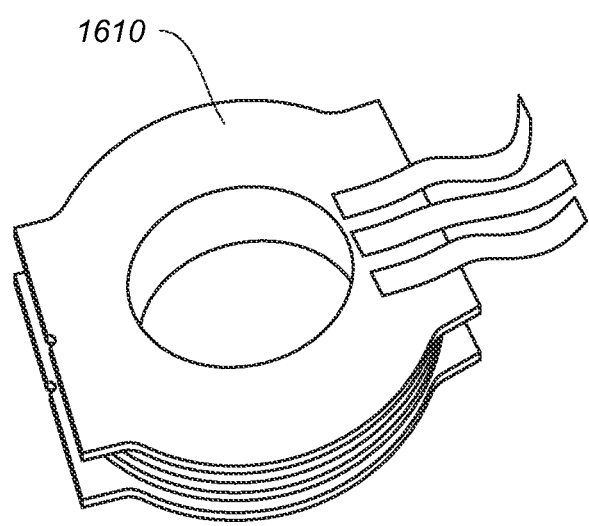
FIG. 16 shows a potential implementation of foil and wire windings as part of a transformer for use in a power adapter.
Figure 17:
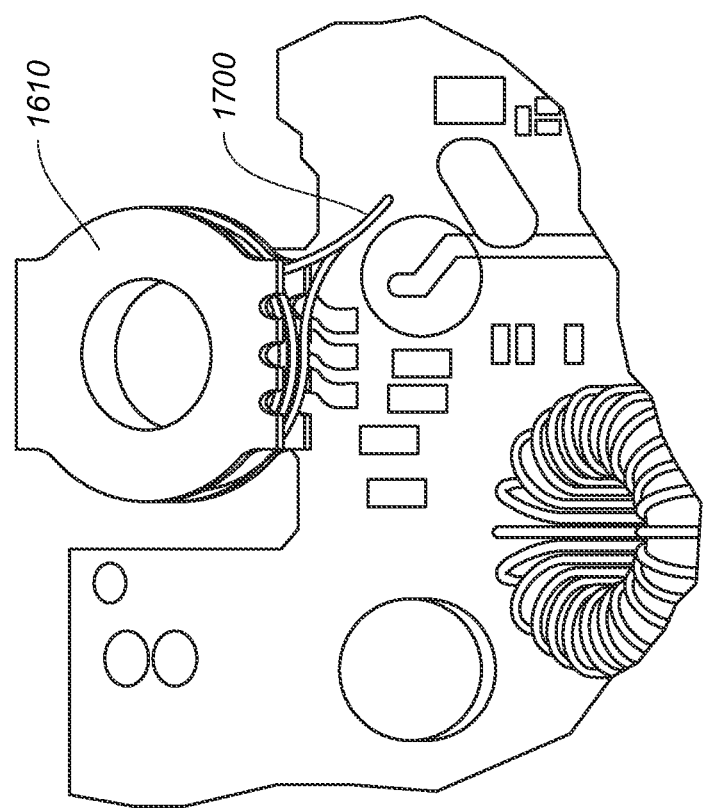
FIG. 17 shows a potential implementation of foil and wire windings as part of a transformer for use in a power adapter.

FIG. 15 shows an embodiment of power adapter 2000 in which windings T1b-d and T1g are windings embedded in circular PCB section 1500. In one embodiment shown in FIG. 16, T1a is a split winding, comprising both a foil winding T1a1 and a wire winding T1a2. FIG. 16 additionally shows the ends of secondary foil windings T1e and T1f, with a coil forming fixture 1610.

FIG. 16 shows coil forming fixture 1610 placed above circular PCB section 1500, with foil windings T1a1, T1e, and T1f terminated on a PCB 1700. Primary wire winding T1a2 is also shown to be terminated to PCB 1700. Following placement of the windings via coil forming fixture 1610 at circular PCB section 1500, the core may be placed at attached to PCB 1700. The core, such as Feroxcube™ EQ core. In alternative embodiments, the core may comprise top and bottom components that connect through an opening in circular PCB section 1500. The core may be glued or otherwise attached to circular PCB section 1500 or affixed through some other attachment or clamp to PCB 1700 that positions the core within windings T1a-f.

Figure 18:
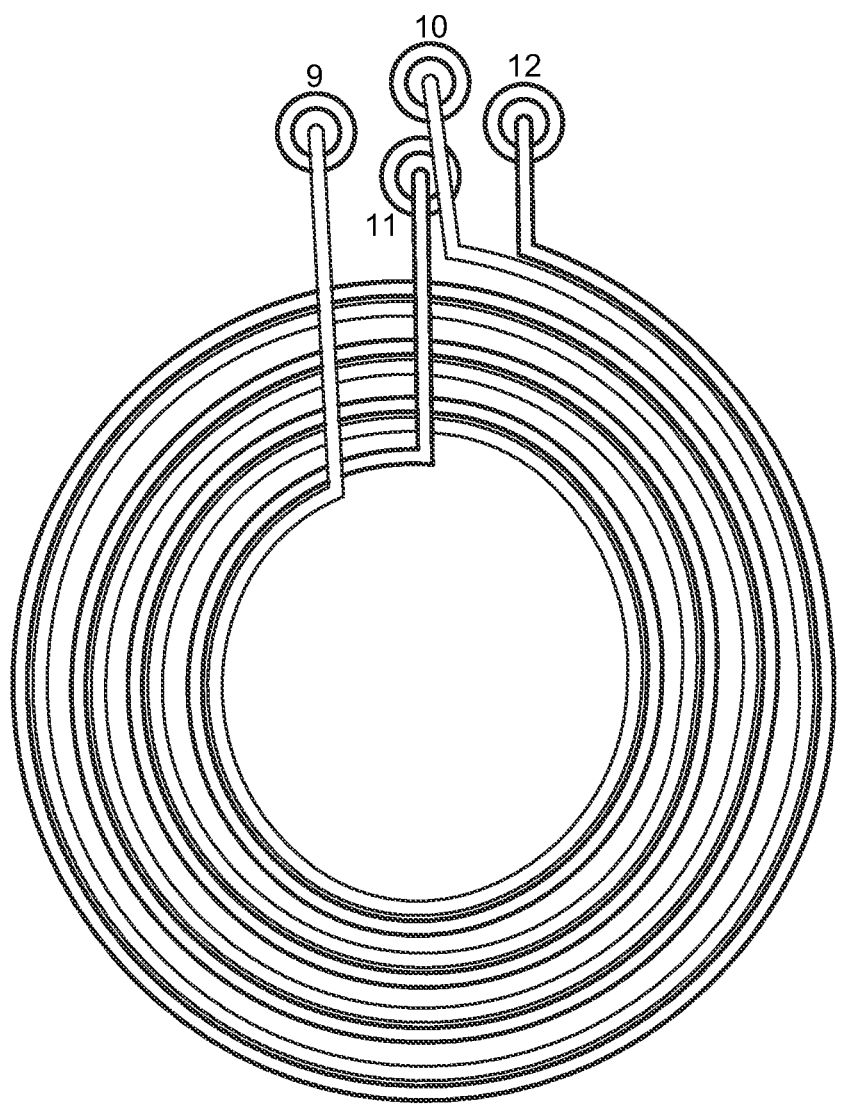
FIG. 18 illustrates potential implementation of foil windings as part of a transformer for use in a power adapter.

FIG. 18 shows an interleaving arrangement for windings T1a and T1e in transformer 1. The interleaving arrangement allows for an efficient high power output in a small space in a synchronous transformer such as synchronous rectifier 80 of FIG. 8. According to the structure of FIGS. 14-18, one embodiment of a transformer T1 as follows: secondary winding of windings T1e from winding end 811 to winding end 812 is wound first around a fixture. Placement of secondary foil windings prior to primary foil winding may allow subsequent steps in setting the structure, such as a milling of the core that may be necessary if the primary foil winding is placed first, to be avoided. In a compact transformer, one potential core may be a Ferroxcube™ EQ25LP core as mentioned above with a gap length of approximately 0.1 mm with an AL of approximately 800 nH. The secondary windings and are wound counterclockwise. Primary winding T1a is wound over 2 layers in a counter clockwise direction after the secondary windings are complete. In one alternative embodiment, tape such as 50 um Mylar tape may be used to keep each foil winding in place after each piece of foil is wound, so secondary windings T1e and T1f may be wound and kept in place with tape, and the primary foil winding T1a1 may subsequently be wound and set in place with Mylar tape. Windings are then attached to pins in a PCB such as PCB 1700 of FIG. 17 to integrate the transformer windings with a circuit contained in the attached PCB.

Discrete Second Bus Start Up Circuit

Figure 12:
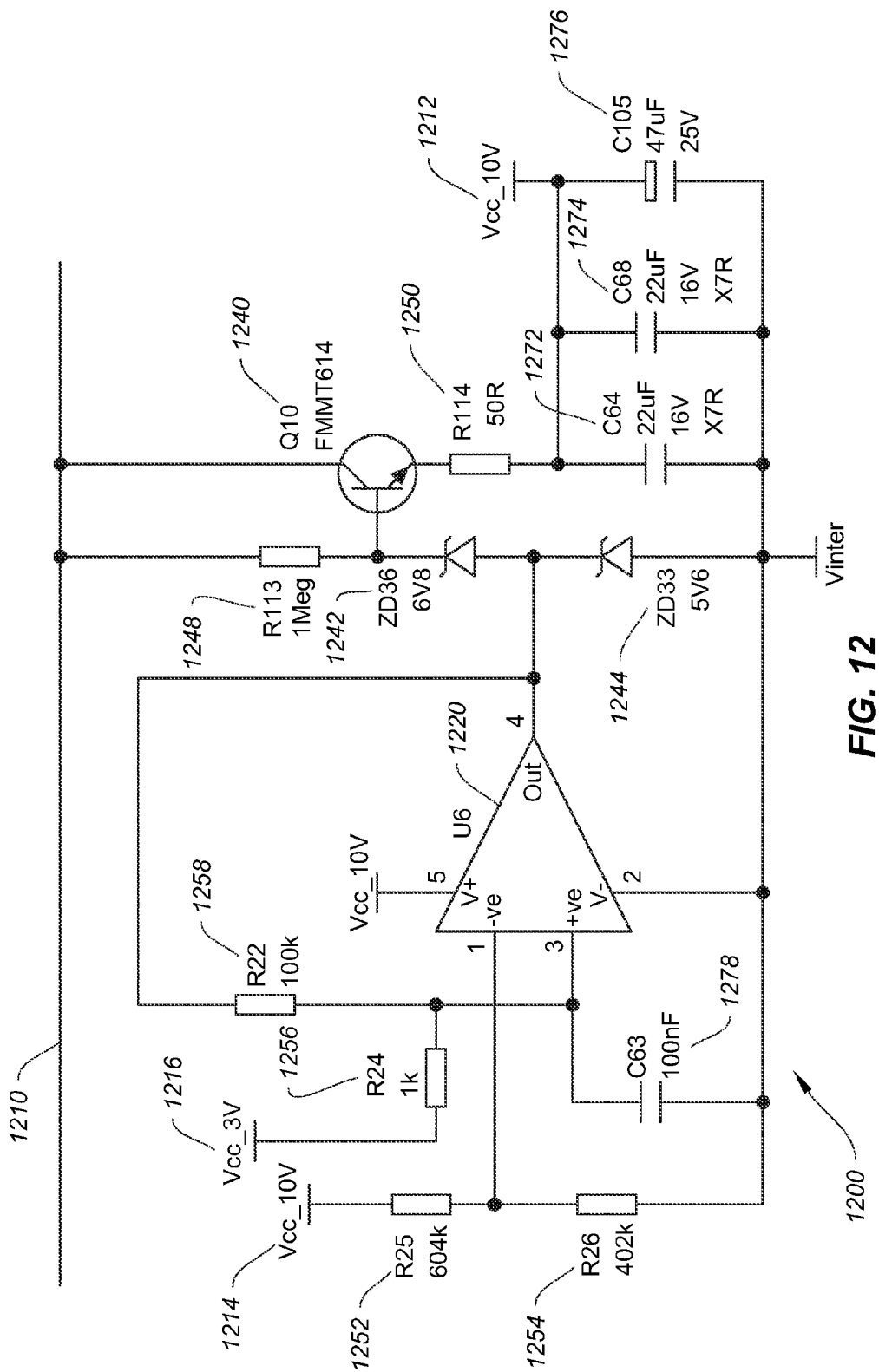
FIG. 12 is a circuit diagram showing a one potential implementation of a discrete second bus start up circuit for use with a power adapter.
Figure 13A:
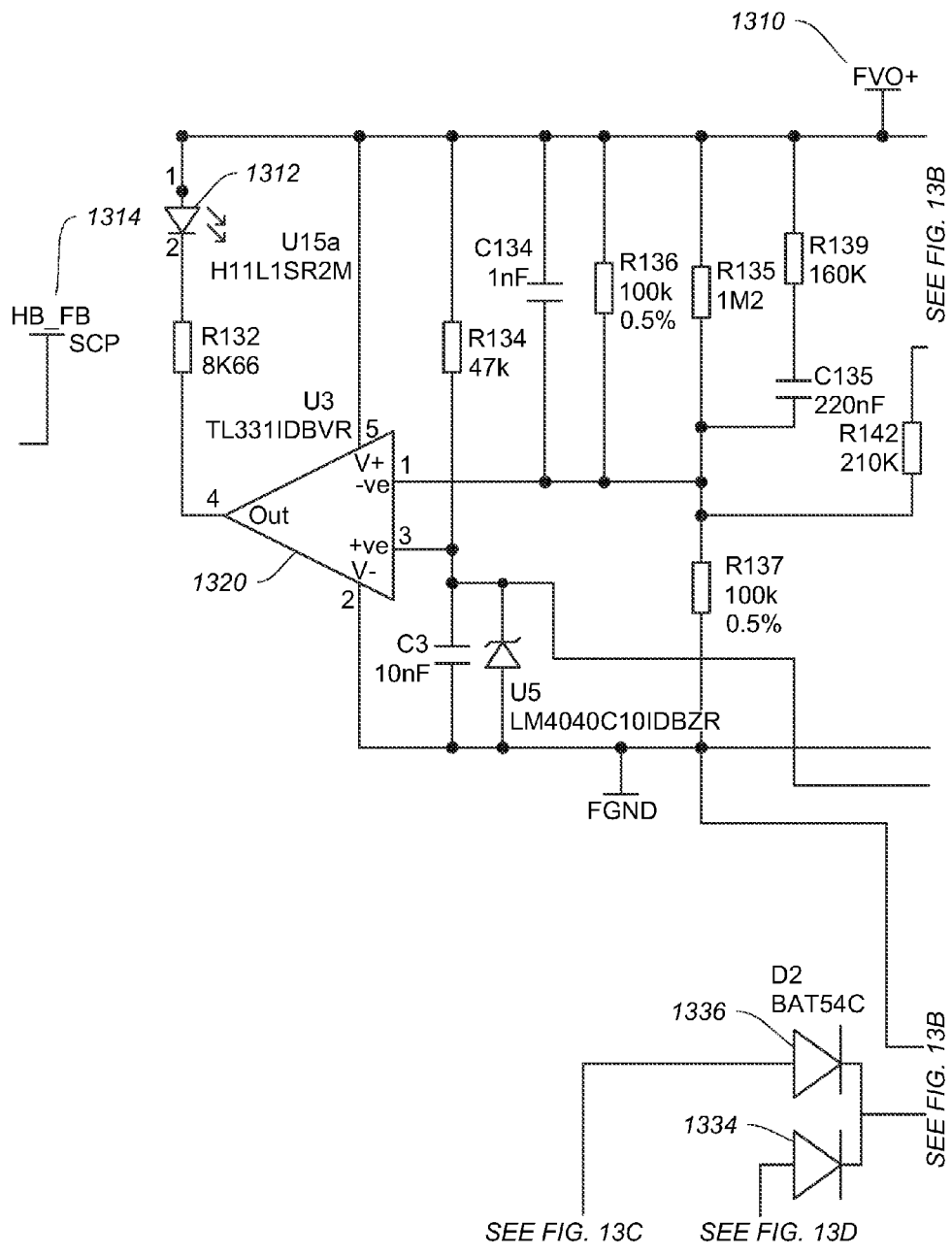
FIG. 13A is a circuit diagram showing one potential implementation of protection circuits for use in a power adapter.
Figure 13B:
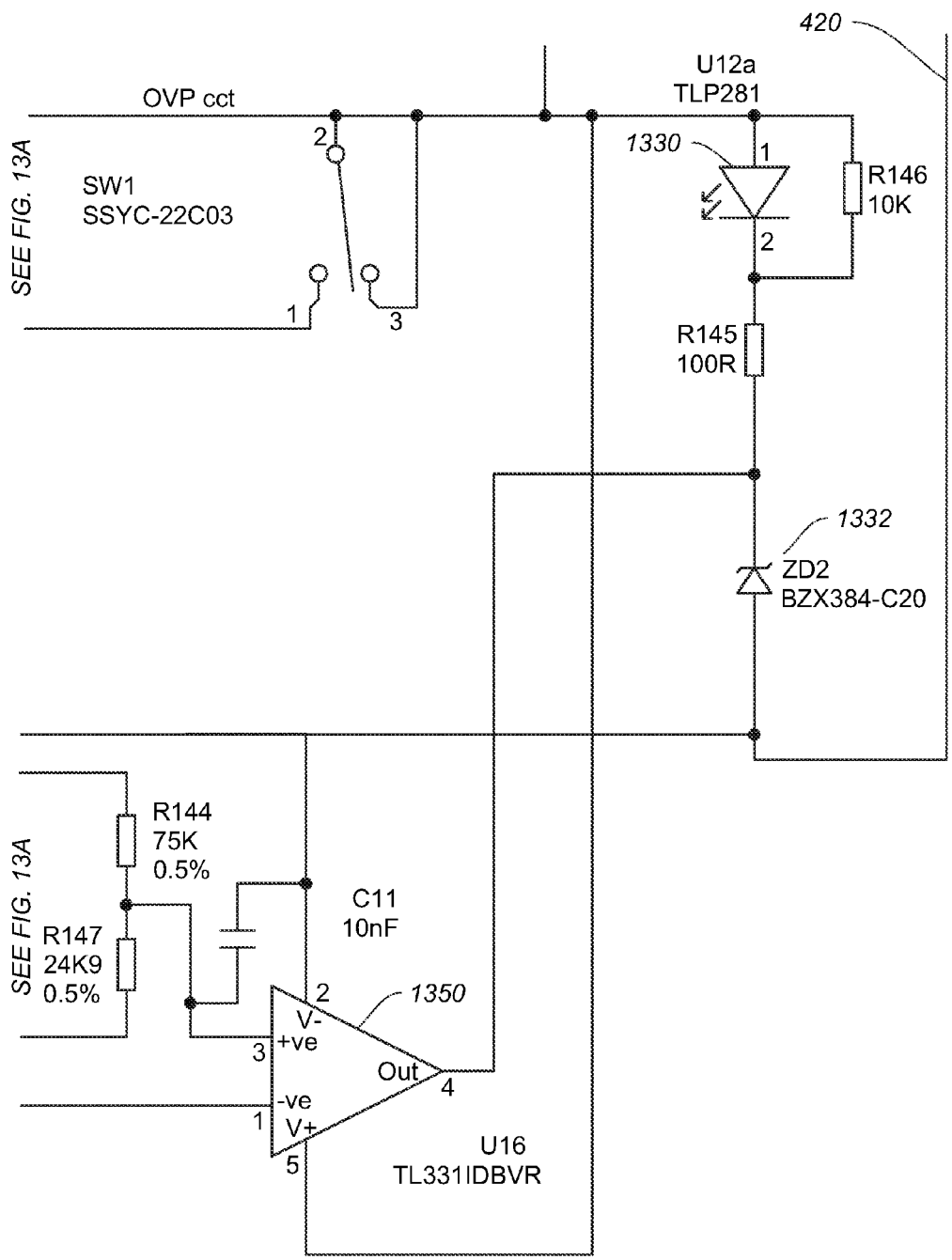
FIG. 13B is a circuit diagram showing one potential implementation of protection circuits for use in a power adapter.
Figure 13C:
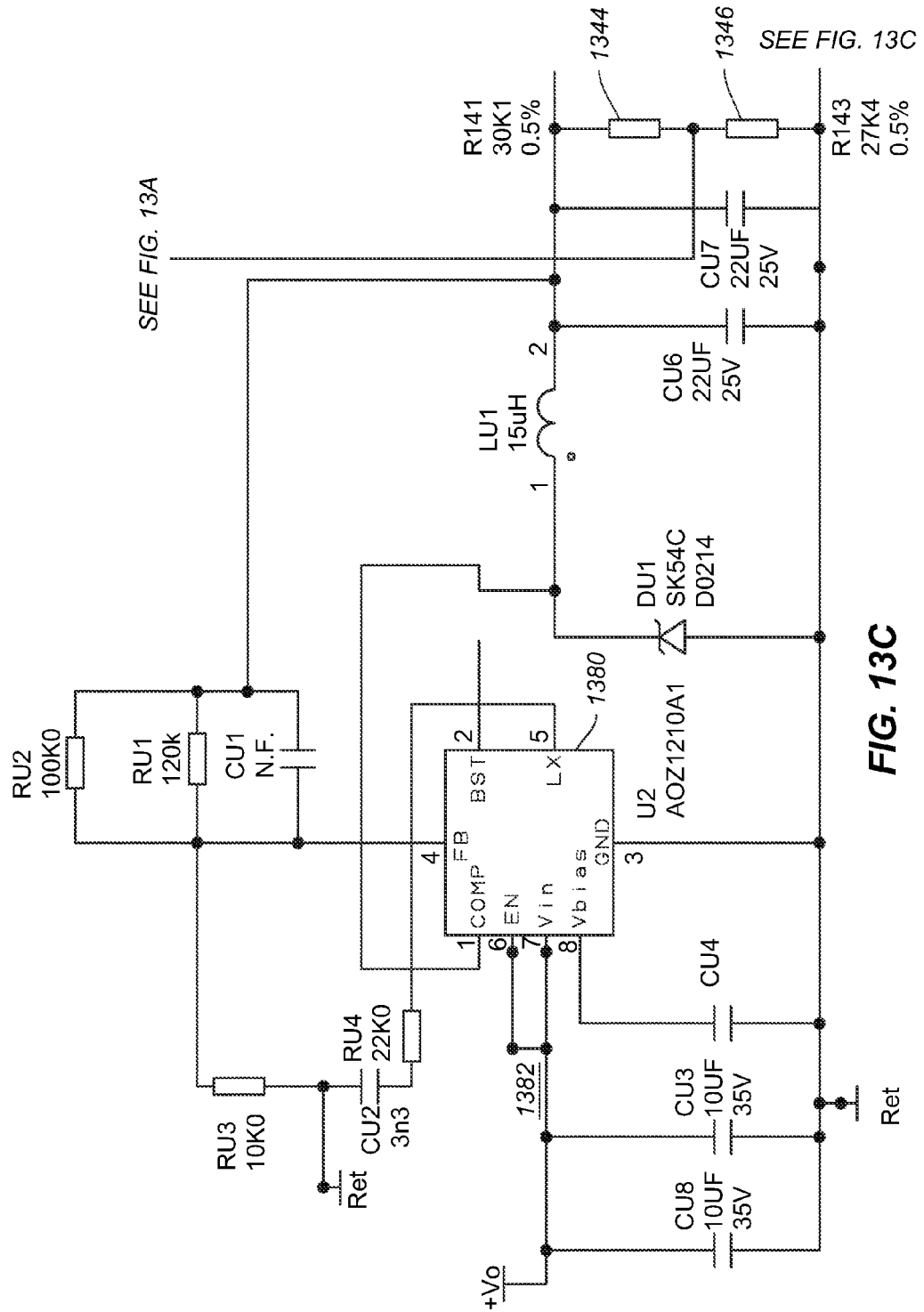
FIG. 13C is a circuit diagram showing one potential implementation of protection circuits for use in a power adapter.
Figure 13D:
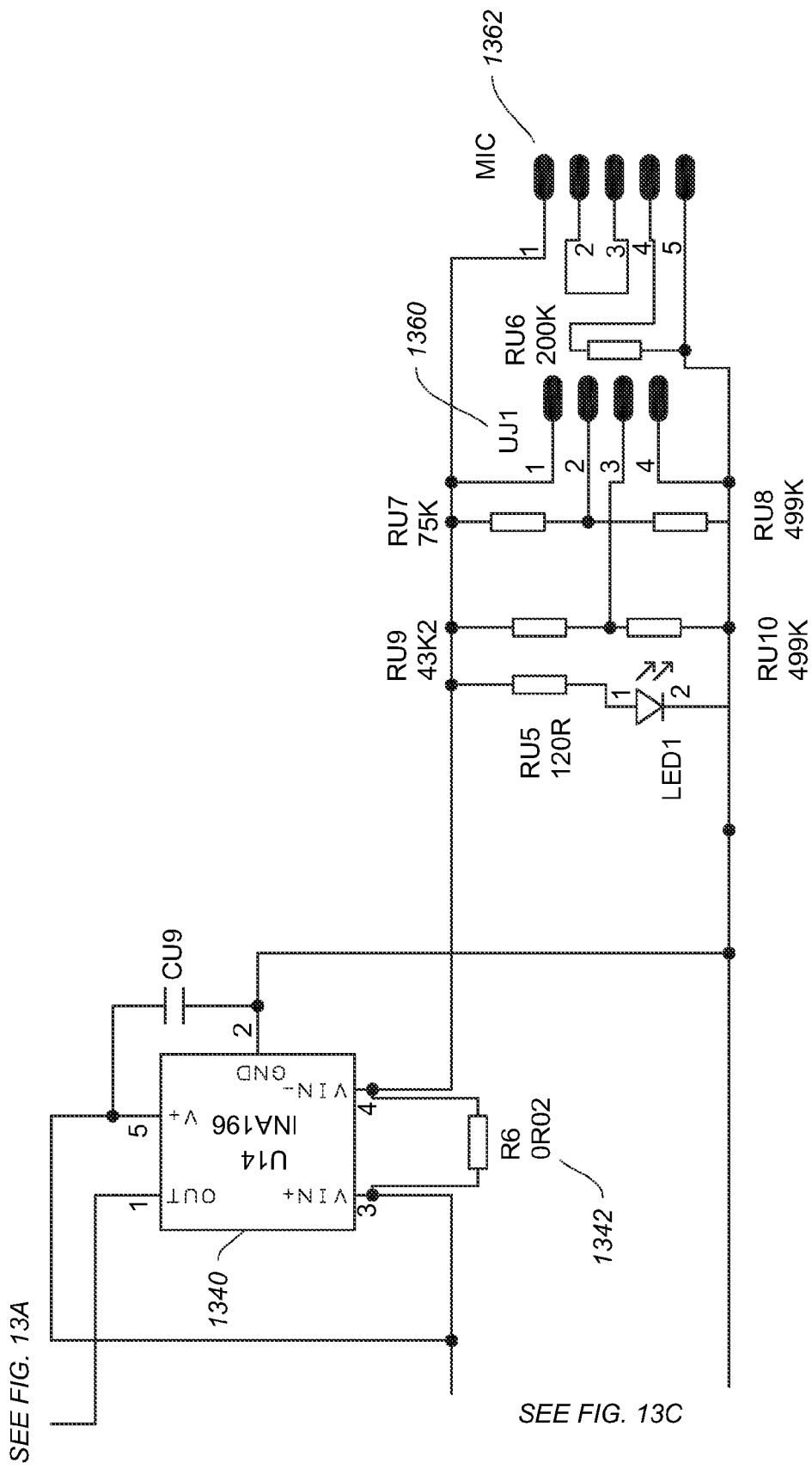
FIG. 13D is a circuit diagram showing one potential implementation of protection circuits for use in a power adapter.
Figure 14:
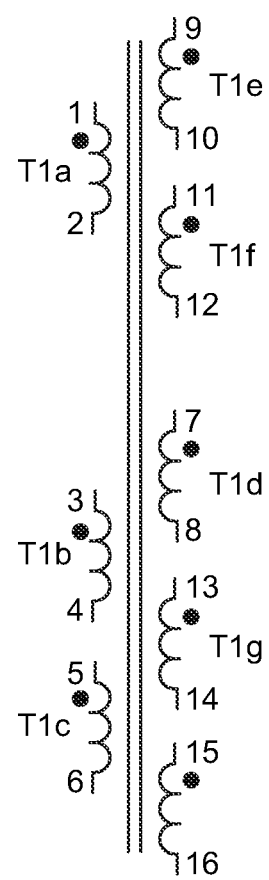
FIG. 14 shows a schematic of one potential implementation of a transformer consistent with aspects of the innovations herein.

FIG. 12 includes discrete second bus start up circuit 1200, which is one potential embodiment of discrete second bus start up circuit 20. Discrete second bus start up circuit 1200 comprises high voltage line 1210, low voltage backup line 1212, first comparison voltage 1214, second comparison voltage 1216, comparator 1220, transistor 1240, diodes 1242-1244, resistors 1248-1258, 1268, and capacitors 1272-1278. High voltage line 1210 receives a DC voltage from a power factor correction circuit 900 of FIG. 9, where high voltage line 1210 of FIG. 12 is connected either directly or indirectly to bus output 252 of FIG. 9. Discrete second bus start up circuit 1200 operates to adapter and maintain power to FET drivers in power adapter 2000 during start up and abnormal operating conditions, as will be described just below with respect to FIGS. 9-12.

DC Output Power Adapter Operation

Start up and function of one potential implementation of power adapter 2000 will now be described in conjunction with discrete second bus start up circuit 1200 of FIG. 12, power factor correction circuit 900 of FIGS. 9A and 9B, synchronous rectification circuit 1100 of FIGS. 11A and 11B, and burst switcher circuit 1000 of FIGS. 10A and 10B.

When power adapter 2000 is enabled through connection of an AC input to an AC source, or in some embodiments, through selection of a switch, the input AC power is rectified and supplied to rectified input 240 of FIG. 9

Rectified input 240 will initially adapter a small amount of power when an AC input of a power adapter such as AC input 22 of FIG. 1 is provided an AC input. The initial power from rectified input 240 is sufficient to activate regulator 242 with a secondary bus voltage level. Regulator 242 then supplies a chip voltage to buck power factor correction circuit 232 at power connection 236. Further, when AC voltage is input to the power adapter associated with power factor correction circuit 900, input 234 receives a rectified AC voltage from a rectifier such as rectifier 23 of FIG. 8. When buck power factor correction circuit 232 is powered on with an input power at power connection 236, and is receiving the AC input voltage at input 234, it functions to output a DC voltage at bus output 252. Power factor correction circuit 900 thus enables a power adapter to have a efficient and relatively high voltage DC bus from an AC input. In one exemplary embodiment, the DC voltage at bus output 252 is 84 V.

Bus output 252 then supplies a DC voltage to high voltage input 1210 of FIG. 12. When high voltage input 1210 receives power diodes 1242 and 1244 clap at voltage settings to set the voltage levels at an input of transistor 1240 to a secondary bus voltage level. The voltage level at low voltage backup line 1212 is therefore set to the secondary bus voltage level. In one potential embodiment, the secondary bus voltage level may be 10V, and may be consistent throughout secondary power levels in power adapter 2000, such as the secondary power level supplied to regulator 242 at startup in FIG. 9. Providing the secondary power levels provides design flexibility in device start up and normal operation through power feedback from the output transformer. In other embodiments, the adapter of secondary power levels may be provided independently at different voltage levels.

When low voltage backup line 1212 achieves a secondary bus voltage level, that voltage is passed to FET drivers 382 and 384 of FIG. 11 to turn the FET drivers on, and the voltage is also passed to low voltage input 1010 of FIG. 10. Low voltage input 1010 of FIG. 10 then provides sufficient power to regulator 1042 with a secondary bus voltage level. Regulator 1042 then supplies a chip voltage to burst switch chip 262 at chipset voltage input 236 from chipset voltage connection 1012. The physical connection from chipset voltage connection 1012 to chipset voltage input 236 is not shown in FIG. 10. Regulator 1042 further provides power to adapter feedback circuit 1020 with power in conjunction with feedback connection 1022 to provide a feedback signal from DC output 430. The feedback operates by a connection from DC output 430 that operates through a circuit to provide a signal at feedback input 268.

In one embodiment, DC output 430 is connected to feedback output line 1310 of FIG. 13. The output voltage is sensed and compared to a reference value by a comparator 1320 on the secondary side, and the comparator 1320 output drives a digital opto-coupler 1312. When the output voltage is below the regulation level, the comparator 1320 output is high and the opto-coupler is not driven; when the output voltage exceeds the regulation level, the comparator 1320 output goes low and turns on the opto-coupler 1312. In this way, the output comparator 1320 acts like a simple ND converter. The opto-coupler 1312 feeds the digital feedback information to the primary side across the isolation barrier of the transformer. In normal mode, the burst switcher circuit 1000 monitors the feedback input 268 to determine the switching cycle and mark/space ratio to maintain an appropriate level of output burst signaling from high gate output 269a and low gate output 269b to meet power demands at DC output 530. When the feedback indicates power is needed, a switching cycle is commenced to output burst power at high gate output 269a and low gate output 269b. Every time a switching cycle is commenced, it is completed fully, regardless of the input at feedback input 268. During each current switching cycle, feedback input 268 is monitored to determine whether or not a subsequent switching cycle should be delivered. If feedback input 268 stays high, then another switching cycle is delivered contiguously. If feedback input 268 goes low, then switching ceases or "drops out" at the end of the current cycle. While delivering switching cycles, feedback input 268 is polled once every switching cycle. Once switching ceases at the end of the cycle, feedback input 268 is monitored while the controller waits for the next feedback input 268 high transition to indicate that switching should recommence.

A switching cycle delivers alternating square wave outputs from high gate output 269a and low gate output 269b. The output of high gate output 269a is deliver to FET driver 382 of FIG. 11. The output of low gate output 269b is delivered to FET driver 384 of FIG. 11. These FET drivers then drive FETs 386 and 388, which in turn drive primary winding T1a of FIG. 11.

When T1a is driven by FETs 386 and 388, it in turn drives windings T1b-g. Windings T1d and T1e then drive FET Q101 of FIG. 11. Windings T1f and T1g drive FET Q102 of FIG. 11. These components then drive the output power available from DC output 430.

When driven by winding T1a, winding T1b of FIG. 9 serves to replace rectified input 240 as the input power source for regulator 242. Winding T1c on FIG. 10 similarly replaces low voltage input 1010 of FIG. 12 as the source of power for both regulator 1042 in FIG. 10 and FET drivers 382 and 384 of FIG. 11. Because FET drivers 382 and 384 are now essentially receiving their operating power and voltage from transformer 1, additional protection circuitry is required to protect certain parts of the circuit in abnormal operating conditions.

When an output load is changed while the power adapter 2000 remains operational during the change, burst switcher circuit 1000 may operate for a time in some embodiments under an incorrect feedback setting, where burst switcher circuit 1000 operates based on an expected feedback of the original load, while comparator 1320 and the comparator 1320 output drives a digital opto-coupler 1312 according to a new output voltage and a new load. Under these circumstances, burst switcher circuit may cease delivering switching cycles while the new output load continues to draw power. As T1a fails to be driven by signals originating from high gate output 269a and low gate output 269b, the power supplied to operate FET drivers 382 and 384 may fall below an operating threshold, and the FET drivers 382 and 384 may shut down without the rest of power adapter 2000 receiving an error or shutdown indication. In this circumstance where FET drivers 382 and 384 have shut down, the feedback input 268 to burst switch chip 262 will eventually reach a level where a switching cycle would have been requested by the old load, and output from high gate output 269a and low gate output 269b will recommence. Because FET drivers 382 and 384 have shut down and no longer respond to an input from high gate output 269a and low gate output 269b, FETs 386 and 388 will begin to draw excess power from high voltage line 1102 which is connected to high voltage line 1210 of FIG. 10, and across transistor 1240 which supplies start up operating power to FET drivers 382 and 384. Because Transistor 1240 is not capable of dealing with this demand, there is a high likelihood that transistor 1240 will be destroyed if it operates normally without support from resistor 1250, comparator 1220, and the related circuitry. Resistor 1250 functions to prevent excessive current from flowing through transistor 1240 in conditions where high voltage line 1210 may draw power through transistor 1240. Comparator 1220 is connected to first comparison voltage 1214 and second comparison voltage 1216 through dividing resistors as shown by FIG. 12. The configuration of comparator 1220 and resistors 1252 through 1258 are provided by example, and may be of any set of values that functions in the fashion described here. First comparison voltage 1214 is attached to the low voltage backup line 1212 which, as described above, provides a start up operating voltage to FET drivers 382 and 384. Second comparison voltage 1216 may be attached to any stable voltage level that does not depend on power from T1 to operate, such as chip voltage at power connection 236 from regulator 242 which may operate from the rectified AC input.

If comparator 1220 senses first comparison voltage 1214 is dropping from the level required to adapter adequate operating power to FET driver 382 and 384, comparator 1220 output drives diode 1242 and transistor 1240 back to the voltage required. In this way, comparator 1220 operates to prevent shutdown of FET drivers 382 and 384, and to prevent potential damage to transistor 1240.

USB Output Operation and Protection Circuits

In addition to the functionality described above, FIGS. 13A, 13B, 13C, and 13D, includes a description of USB outputs 1360 and 1362 that may be incorporated into various embodiments according to the present invention. In various embodiments USB outputs 1360 and 1362 may be mini, micro, or any other form factor of USB output. FIG. 13 also shows USB switcher 1380, which includes USB switcher power input 1382. USB switcher power input 1382 receives power from DC output 420 or from a power adapter derived from or just prior to power adapter 2000 DC output 420 around FETs Q101 AND Q102. USB switcher is preferably rated to adapter a combined output at USB outputs 1360 and 1362 of at least 2.5 A. In one embodiment, USB switcher is rated to provide 4 A.

Diode 1330 is a part of an opto-isolator comprising diode 1330 of FIG. 13 and transistor 250 of FIG. 9. When diode 1330 conducts and transmits a signal across the power adapter isolation barrier to transistor 250, a signal is sent from transistor 250 to fault input 238 of buck power factor correction circuit 232. This causes buck power factor correction circuit 232 to shut down the entire power adapter, including the high voltage output and FETs that enables power at the outputs of power adapter 2000. For example, when DC output 420 is too high, diode 1332 will begin to conduct, driving current through diode 1330, thereby sending the signal to transistor 250 and fault input 238 of buck power factor correction circuit 232. Fault input 238 operates without an automatic restart for power adapter 2000, thereby preventing additional damage that may occur with standard switching power supplies operating with single and lower power USB outputs, where current flows under a fault condition are less likely to cause damage. Because power adapter 2000 operates with a high current output, faults require removal of the AC input to restart power adapter 2000 and to prevent damage that may be caused by automated fault recovery from overvoltage and overcurrent conditions.

Similarly, monitoring circuit 1340 measures a voltage across resistor 1342, which carries the output current to the USB outputs 1360 and 1362. When the USB output current, and therefore the voltage across resistor 1342 exceeds a predetermined value, current monitoring circuit activates diode 1334 which enables comparator 1350 to set an output that activates diode 1330. Diode 1332 will begin to conduct, driving current through diode 1330, thereby sending the signal to transistor 250 and fault input 238 of buck power factor correction circuit 232.

Additionally, resistors 1344 and 1346 divide the USB output voltage supplied to USB outputs 1360 and 1362. When the voltage exceeds an amount determined by the circuit design, diode 1336 is activated to enable comparator 1350 to set an output that activates diode 1330. Diode 1332 will begin to conduct, driving current through diode 1330, thereby sending the signal to transistor 250 and fault input 238 of buck power factor correction circuit 232.

In an alternative embodiment, power adapter 2000 may comprise a second USB switcher similar to USB switcher 1380, a second circuit similar to monitoring circuit 1340, and a third and fourth USB power supplies. The second USB switcher receives input power in the same fashion as the first USB switcher, and has overcurrent monitoring and voltage monitoring through circuits that duplicate the functionality described above in parallel to the functionality of the first USB switcher 1380. When the second USB switcher experiences a fault, additional comparator circuitry is disposed to turn on diode 1330 in the same fashion done with comparator 1350, with an extra level of logic to enable comparator 1350 and the inputs from the second USB switcher to send a fault signal via diode 1330.

In addition to the specific functioning of the elements of power adapter 2000 described above, the operation of power factor correction circuit 30, chipset regulator 40, discrete second bus start up circuit 20, and USB switcher 110 enabled with surface mount technology and a hybrid transformer that incorporates both foil windings and planar windings embedded in a PCB creates a power adapter with a higher power density than available previously in power adapters. In one embodiment, the power supply package of FIGS. 1-7 have the dimensions approximately 5 inches (or less) long by four inches (or more) wide by 0.3 to 0.8 inches high, which in conjunction with the innovations disclosed above and standard heat dispersion technology may enable power density greater than 12 W per cubic inch.

The figures described above detail one potential embodiment of the above described power adapter. The above description including all of the various circuit descriptions of the figures and the related description is illustrative and is not restrictive, and is indented to shown example embodiments illustrating implementations of the invention. Moreover, any one or more features of any embodiment of the invention may be combined with any one or more other features of any other embodiment of the invention, without departing from the scope of the invention. Any use of "a", "an", or "the" is intended to mean "one or more" unless specifically indicated to the contrary.

Many variations of the invention will become apparent to those skilled in the art upon review of the disclosure. The scope of the invention should, therefore, be determined not with reference to the above description, but instead should be determined with reference to the pending claims along with their full scope or equivalents. One or more features from any embodiment may be combined with one or more features of any other embodiment without departing from the scope of the invention. Where approximate or "about" is described for measurements, embodiments herein also contemplate the exact measurement. Where a shape is disclosed, such as a rectangular surface, embodiments herein contemplate other suitable shapes, such as multi-sided blocks or rounded surfaces.

What is claimed is:

1. A power adapter comprising:
   an AC input;
   a rectifier coupled to the AC input;
   a power factor correction circuit coupled to the rectifier; and
   a burst switch circuit coupled to the power factor correction circuit, wherein the burst switch circuit provides power to a DC output via a set of FET drivers, a set of FETs, and a transformer, and wherein the burst switch circuit provides power exclusively in a burst mode using a feedback input from the DC output;
   wherein the transformer comprises a first winding coupled to the set of FETs, and second, third, fourth, and fifth windings each coupled to the first winding;
   wherein the second winding and the third winding are embedded in a printed circuit board; and
   wherein the fourth and fifth winding each comprise a conductive ribbon that loops around a transformer core.

2. The power adapter of claim 1 further comprising a power adapter housing enclosing the power adapter such that the power density of the power adapter enclosed by the power adapter housing is greater than 12 W/cubic inch.

3. The power adapter of claim 2 further comprising a high voltage line coupled to a bus output of the power factor correction circuit.

4. The power adapter of claim 3 further comprising a diode coupled to a transistor, wherein the transistor is further coupled to the high voltage line.

5. The power adapter of claim 4 further comprising a comparator coupled the set of FET drivers and a comparison voltage input.

6. The power adapter of claim 5 wherein the diode and the transistor operate at a start-up of the power adapter to create a low voltage backup that provides operating power to the set of FET drivers at the start-up of the power adapter.

7. The power adapter of claim 6 wherein the second winding creates a FET driver operating voltage that replaces the low voltage backup in providing power to the set of FET drivers when the second winding is driven by the first winding.

8. The power adapter of claim 7 wherein the comparator compares a first comparison voltage from the comparison voltage input with the FET driver operating voltage.

9. The power adapter of claim 8 wherein an output of the comparator is coupled to the transistor to maintain the low voltage backup when the FET driver operating voltage drops below a predetermined threshold set by the first comparison voltage.

10. The power adapter of claim 9 further comprising a USB switcher coupled to the DC output that drives a USB voltage and a USB current to a first USB output and a second USB output.

11. The power adapter of claim 10 further comprising a first monitoring circuit that monitors the USB current and activates a fault input of the power factor correction circuit when the USB current exceeds a current threshold.

12. The power adapter of claim 11 further comprising a second monitoring circuit that monitors the USB voltage and activates the fault input of the power factor correction circuit when the USB voltage exceeds a voltage threshold.

13. The power adapter of claim 12 further comprising a third monitoring circuit that activates the fault input of the power factor correction circuit when a DC output voltage of the DC output exceeds a DC voltage threshold.

14. A high power density multi-output power adapter system comprising:
   an AC input;
   a rectifier coupled to the AC input;
   a power factor correction circuit coupled to the rectifier;
   a burst switch circuit coupled to the power factor correction circuit, wherein the burst switch circuit provides power to a DC output via a set of FET drivers, a set of FETs, and a transformer, and wherein the burst switch circuit provides power exclusively in a burst mode using a feedback input from the DC output; and
   a USB switcher coupled to the DC output that drives a USB voltage and a USB current to a first USB output and a second USB output; and
   a power adapter housing enclosing the power adapter system such that the power density of the power adapter enclosed by the power adapter housing is greater than 12 W/cubic inch.

15. The high power density multi-output power adapter system of claim 14 wherein the transformer comprises a first winding coupled to the set of FETs, and second, third, fourth, and fifth windings each coupled to the first winding;

wherein the second winding and the third winding are embedded in a printed circuit board; and wherein the fourth and fifth winding each comprise a conductive ribbon that loops around a transformer core.

16. The high power density multi-output power adapter system of claim 15 further comprising:
a first monitoring circuit that monitors the USB current and activates a fault input of the power factor correction circuit when the USB current exceeds a current threshold;
a second monitoring circuit that monitors the USB voltage and activates the fault input of the power factor correction circuit when the USB voltage exceeds a voltage threshold; and
a third monitoring circuit that activates the fault input of the power factor correction circuit when a DC output voltage of the DC output exceeds a DC voltage threshold.

17. The high power density multi-output power adapter system of claim 14 further comprising a high voltage line coupled to a bus output of the power factor correction circuit;
a diode coupled to a transistor, wherein the transistor is further coupled to the high voltage line; and
a comparator;
wherein the diode and the transistor operate at a start-up of the power adapter to create a low voltage backup that provides operating power to the set of FET drivers at the start-up of the power adapter;
wherein the second winding creates a FET driver operating voltage that replaces the low voltage backup in providing power to the set of FET drivers when the second winding is driven by the first winding; and
wherein the comparator compares a first comparison voltage with the FET driver operating voltage and the output of the comparator is coupled to the transistor to maintain the low voltage backup when the FET driver operating voltage drops below a predetermined threshold set by the first comparison voltage.

18. The high power density multi-output power adapter system of claim 17 further comprising an opto-coupler coupled to the comparator output, wherein the opto-coupler provides digital feedback information to a primary side of the adapter across an isolation barrier created by the transformer.

19. The high power density multi-output power adapter system of claim 15 wherein a core of the transformer is a Feroxcube EQ core.

20. The high power density multi-output power adapter system of claim 19 wherein the core of the transformer is attached to a circular PCB section of a PCB on which the burst switcher circuit is mounted, and wherein the windings of the transformer are set in an interleaving arrangement around the circular PCB section.

* * * * *